United States Patent [19]
Mitzlaff

[11] Patent Number: 4,866,766
[45] Date of Patent: Sep. 12, 1989

[54] TELEPHONE DEVICE HAVING CUSTOMIZED RING CAPABILITY

[75] Inventor: James E. Mitzlaff, Arlington Heights, Ill.

[73] Assignee: Motorola, Inc., Schaumburg, Ill.

[21] Appl. No.: 240,180

[22] Filed: Sep. 6, 1988

[51] Int. Cl.⁴ ............................................ H04M 1/00
[52] U.S. Cl. ...................................... 379/374; 379/373
[58] Field of Search ........................ 379/373, 374, 375; 84/DIG. 12

[56] References Cited

U.S. PATENT DOCUMENTS

| | | | |
|---|---|---|---|
| 3,255,292 | 6/1966 | Park | 84/1.03 |
| 4,217,805 | 8/1980 | Tamada | 84/DIG. 12 X |
| 4,344,345 | 8/1982 | Sano | 84/DIG. 12 X |
| 4,454,796 | 6/1984 | Inone et al. | 84/DIG. 12 X |
| 4,480,153 | 10/1984 | Festa | 379/374 |
| 4,662,262 | 5/1987 | Matsumoto | 84/DIG. 12 X |
| 4,674,383 | 6/1987 | Suzuki | 84/DIG. 12 X |

OTHER PUBLICATIONS

"Electronic Telephone Circuits", Motorola Semiconductor Master Selection Guide and Catalog, 1988, p. 76.

Primary Examiner—James L. Dwyer
Attorney, Agent, or Firm—Rolland R. Hackbart

[57] ABSTRACT

A telephone set incorporates a conventional keypad to allow the user to program a custom ring tone and pattern into the telephone set. After such programming is established, when the telephone set detects a ring signal from the central switching station, a ringer is activated and deactivated according to the programmed ringing parameters so as to provide a truly customized ring signal to the user.

2 Claims, 2 Drawing Sheets

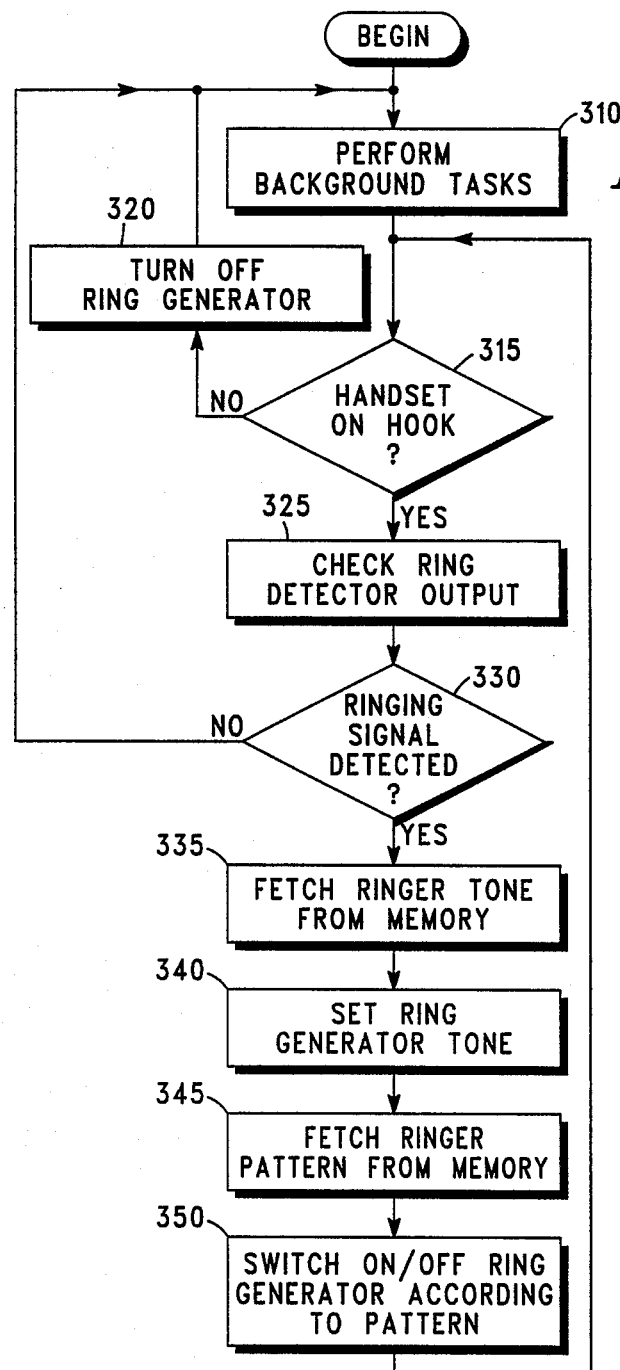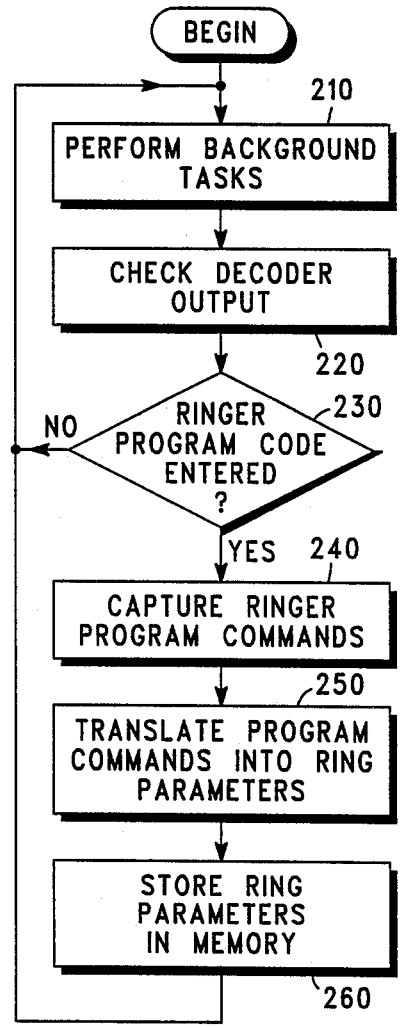

TELEPHONE DEVICE HAVING CUSTOMIZED RING CAPABILITY

FIELD OF THE INVENTION

The present invention relates generally to telephone set ringing devices and more particularly, to the practice of variably controlling such ringing devices.

DESCRIPTION OF THE PRIOR ART

Known techniques for activating the ringer in a telephone set fall into two general areas. The first area encompasses direct techniques, wherein a high voltage, subaudible, signal is placed on the subscriber line in order to directly power the ringer in the telephone set. The second area includes indirect techniques, wherein a specific analog or digital signal is placed on the subscriber line in order to activate a ringing device which contains circuitry to detect the presence of the ringing signal on the subscriber line.

All of the above techniques suffer from one principal drawback, namely that an audible ringing signal produced by each telephone set is virtually identical. In a large office area in which several telephones are located, this makes it extremely difficult for a person away from his desk to determine which telephone is ringing. This difficulty is mainly caused by the similarity between prior art ringing devices, which offer the user little or no opportunity to alter the audible ringing signal so that his telephone set produces a distinctive audible ringing signal.

There have been attempts to address this problem. One known prior art system, the "MERLIN" ™ office telephone system, available from AT&T, offers only the selection of one of three tones for the audible ringing signal by means of a switch on the telephone set. Another system, referred to as CLASS, provides one of several customized rings from a central office. This feature is only provided to paying subscribers and is limited by the capacities of the central office.

In all known cases, the pattern of the audible ringing (i.e. pulse duration and timing within the ringing interval) is strictly fixed by and dependent upon the pattern of direct or indirect ringing signals placed on the subscriber line by the telephone switching office. Such control is not applicable for radiotelephone systems, and it prevents the user of a telephone from truly customizing the ring tone.

There is therefore a need for telephone ringing system which overcomes the aforementioned problems.

OBJECTS OF THE INVENTION

It is a general object of the present invention to provide a telephone ringing system which overcomes the above deficiencies.

It is a more specific object of the present invention to provide a programmable telephone set ringing device, also useful for radiotelephone applications, having ringing patterns and tones which may be customly programmed by the user.

BRIEF DESCRIPTION OF THE DRAWINGS

The features of the present invention which are believed to be novel are set forth with particularity in the appended claims. The invention, together with further objects and advantages thereof, may best be understood by making reference to the following description taken together with the accompanying drawings, in which reference numerals identify the elements, and wherein:

FIG. 2 is a flow chart of an input process which may be implemented using a microprocessor (MPU) 145 of FIG. 1 to establish a customized ring;

FIG. 3 is a flow chart of a process which may be implemented using the MPU 145 of FIG. 1 to activate the ringer in the telephone set upon receipt of a ringing signal on the telephone line.

DESCRIPTION OF THE PREFERRED EMBODIMENT

The present invention is directed to a telephone set having user-customized ringing capability. More particularly, the present invention is directed to a telephone set having programmable input capabilities which may be selected to specify a plurality of ring parameters independent of any ringing signal supplied by the telephone switching office.

Figure 1:
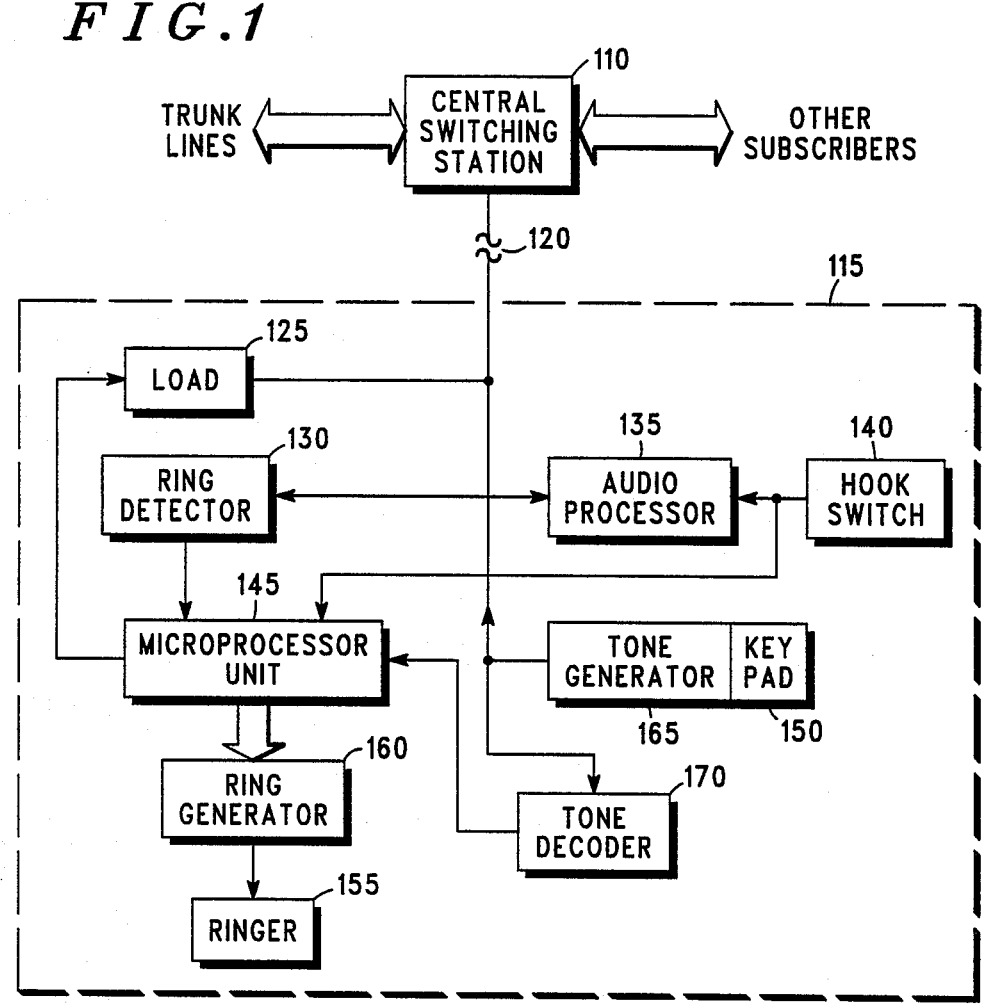
FIG. 1 is a block diagram of a telephone system incorporating a telephone set with a programmable ringing device, according to the present invention.

FIG. 1 illustrates such a telephone set. In FIG. 1, a conventional central switching station 110 (e.g., central office or cellular switch) is shown coupled to a telephone set 115. Coupling therebetween is provided by a communication link 120. The communication link is preferably a radio frequency channel such as that provided for conventional cellular communication. Alternatively, the communication link 120 may be implemented using standard tip and ring lines, fiber or other types of known subscriber lines.

The telephone set 115 preferably appears as a standard touch-tone telephone set. However, the circuit arrangement within the telephone set 115 is novel, according to the present invention. Included therein are conventional circuits: switchable load 125, ring detector 130, audio processor 135 and hook switch 140. Consistent with conventional operation, the load 125 electrically simulates the off-hook condition produced by a standard analog telephone, but is under direct control of a microcomputer (MPU) 145 rather than being directly controlled by a hook switch as in the conventional operation. Of course, the load 125 is only needed in such a situation where communication link 120 comprises conventional tip and ring lines.

The ring detector 130 detects the presence of a ring signal on the communication link 120. The ring detector 130 produces a high logic level signal to the MPU 145 upon detection of the ring signal. This logic level stays high for a period of time, preferably about 6 seconds, which is the selected maximum interval between consecutive ring signals received over the communication link 120.

The audio processor 135, consistent with conventional operation, separates inbound and outbound audio signals on the communication links and couples them to the microphone and earpiece, respectively, in the user handset (not shown). The audio processor 135 may be implemented using a conventional hybrid transformer.

The hook switch 140 indicates when the handset (not shown) is off hook.

The MPU 145 may be implemented using one of many commercial microprocessor devices. Preferably, the MPU 145 includes digital I/0 and interrupt capability. An exemplary microprocessor is the M68HC11, available through Motorola, Inc. As will be subsequently discussed with FIGS. 2 and 3, the MPU 145 receives input command messages via a keypad 150, and in response thereto, controls a ringer 155 through a ring generator 160 to provide user customized ring.

The tone generator 165 and the keypad 150 may be implemented using conventional telephone (control) circuits. For general information on telephone circuitry, reference may be made to MOTOROLA SEMICONDUCTOR MASTER SELECTION GUIDE AND CATALOG, 1988, p. 76, Motorola, Inc., P.O. Box 20912, Phoenix, Ariz. 85036, and data sheets supporting the integrated circuit MC34010 illustrated therein.

More particularly, the MPU 145 receives messages from the keypad 150 through the tone generator 165 and a tone decoder 170. The tone generator 165, as indicated above is preferably a conventional DTMF generator responding to a conventional telephone keypad. The tone decoder 170 is preferably a DTMF decoder such as that which is described in Motorola Semiconductor Application Note AN-08, incorporated herein by reference. The tone decoder 170 decodes the keypad output provided through the tone generator 165 and produces a unique digital code word for each detected DTMF tone. These code words, provided by the tone decoder 170, are received by the MPU 145.

The ring generator 160 is preferably composed of a conventional digital to analog signal converter (DAC) whose analog output is coupled to the frequency control input of a voltage controlled oscillator, such as an NE566, available from Signetics, Inc. The MPU 145 is used to program the ring tone by inputting digital codes to the DAC and is coupled to the voltage controlled oscillator to control the oscillator in an on-off manner, as dictated by ring parameters, subsequently discussed. The ringer 155 is preferably composed of a speaker which receives the output of the voltage controlled oscillator. There are various other ways such tone generation may be accomplished. For example, the variable frequency timing pulse source from U.S. Pat. No. 3,255,292 may be employed as well as programmable sound generators incorporated in integrated circuits UMC 3482 and AY-3-8910A, both of which are available from Radio Shack, Inc. and depicted in Radio Shack's 1988 Catalog, No. 419. Alternatively, the ring generator may comprise a power bell, buzzer, electronic beeper or a programmable audio oscillator circuit such as the MC34012A, available from Motorola, Inc. followed by an audio amplifier so as to provide drive to a speaker simulating a ringer.

In FIG. 2, a flow chart illustrates the manner in which the MPU 145 may implement such messages. The flow chart begins at block 210 where the MPU is illustrated performing background tasks. At block 220, the MPU polls the tone decoder or, alternatively, is interrupted by the tone decoder via an interrupt line. At block 230, a test is performed to determine if a ringer program code has been entered. The ringer program code is a special predesignated code which informs the MPU that the user desires to program ring parameters into the telephone set. For example, this code may be implemented by the following series of keys: *#*. If the MPU does not detect the input of the program code, flow returns to block 210. If the MPU detects the input of the program code, flow proceeds from block 230 to block 240.

At block 240, the MPU awaits the input of the customized ringer program commands. These commands represents selection of the ring parameters previously referred to. Preferably, once the program code has been entered, the following parameters are input by the user: ringer tone, single pulse duration, number of pulses per group, pulse group duration, intergroup delay, and the intercycle delay.

When fewer than all four of these parameters are input by the user, the MPU reverts to either a predetermined telephone set parameter or the most recent parameter input by the user. Additionally, the MPU may be programmed to allow the user to select the maximum ring duration. Each of these parameters, including the ring cycle duration is illustrated in and subsequently discussed with FIG. 4.

Figure 4:
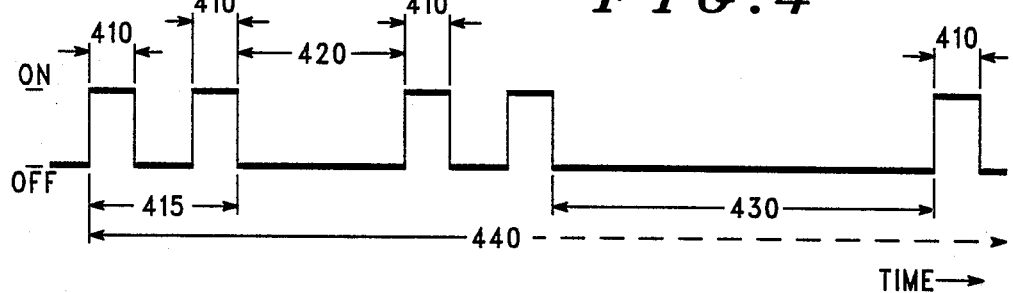
FIG. 4 is a timing diagram, according to the present invention, illustrating a programmable ringing sequence that can be programmed by the telephone set user and executed by the MPU 145 of FIG. 1.

From block 240, flow proceeds to block 250 where the MPU translates the ringer program commands into the ring parameters illustrated in FIG. 4. At block 260, the MPU stores the ring parameter's in memory for subsequent use.

In FIG. 3, the subsequent use of these program parameter is illustrated. After performing background tasks (block 310), the MPU performs a test to determine if the handset is on hook, depicted at block 315. If the handset is not on hook, flow proceeds to block 320 where the ring generator is turned off. From block 320, flow returns to block 310.

If the handset is on hook, flow proceeds from block 315 to block 325 where the MPU polls the output of the ring detector. At block 330, a test is performed to determine if the output of the ring detector indicates that a ring signal is present. If not, flow returns to block 310. If a ring signal is detected, flow proceeds from block 330 to block 335.

At block 335, the MPU begins to retrieve the ring parameters from memory (internal to the microcomputer). At block 335, the ring tone is retrieved. At block 340, the MPU sets the ring generator tone by programming the ring generator in the case of a tone-programmable ring generator. Blocks 335 and 340 may be bypassed in the case where the ring generator and ringer can only produce one fixed output tone.

At block 345, the MPU retrieves the ringer pattern from memory. The ring pattern is determined according to the previous programmed pulse group duration, intergroup delay and intercycle delay. Of course, the ring cycle duration can be retrieved at this time as well and may be implemented using a software timing routine to terminate the activation of the ring generator after a period of time. At block 350, the MPU begins activating and deactivating the ring generator according to the established ring pattern (and ring tone). From block 350, flow returns to block 315. Blocks 315 through 350 constitute a program loop which maintains the selected ringing pattern as long as a ringing signal is present on the channel and the handset remains on hook.

In FIG. 4, the previously discussed ring parameters are illustrated in an exemplary programmed waveform. The ring cycle duration 440 is the period during which the ring generator is controlled to audibly signal the telephone set user that a party is calling. The pulse duration 410 is the selected maximum continuous period the ring generator is activated. The number of pulses per group (2 in this example) and the pulse duration define the pulse group duration 415. In the above embodiment, the MPU controls the ring generator at a 50% duty cycle within a pulse group duration, i.e., the ring generator is activated for the same amount of time the ring generator is inactivated. The intergroup delay 420 is established as the off time between each pulse group. The intercycle delay 430 is the period which sets apart two cycles of pulse groups and intergroup delays.

The foregoing operation may be best illustrated by the following example. Presuming the ringer program code has already been entered, the user first selects one of the keys 0-9 to select a ringer tone (in units of 100 Hz above a base frequency of 440 Hz). The user then selects one of the keys labeled 1-9 in order to set the pulse duration (each number representing a unit of 0.1 second). Next, the user selects a key numbered 1-4 to set the number of pulses per group. Subsequently, the user selects a key numbered 1-3 to set the intergroup delay, in units of 0.5 seconds. The user then selects a key number 1-4 to select the number of groups per ring cycle. The user then selects a key numbered 1-3 to set the intercycle delay, in units of seconds. Finally, if desired, the user sets the ring cycle duration by entering two sequential digits from 00 to 99. After the second of these two digits is received, the MPU proceeds to the operation set out in FIG. 3.

Accordingly, the present invention provides a telephone set having circuitry which may be customized to the user's desire. While being directed primarily to a radiotelephone application, the present invention facilitates customized ring signal without any need of employing a ring tone provided by the switching station.

As set out in the following claims, it will be understood by those skilled in the art that the foregoing illustrations and discussion merely exemplify preferred embodiments of the present invention and that there is modifications and changes may be made without departing from the spirit and scope thereof.

I claim:

1. A telephone set responsive to a ring signal including, a user programmable ringer, a keypad for both dialing out and programming said ringer, said set further comprising;
    processing means, integral to the telephone set, for receiving a plurality of user coded ring parameters from said keypad, said processing means including, memory means for storing from said processing means said coded ring parameters;
    ring generator means, integral to the telephone set responsive to the processing means and to the ring signal, for activating said user programmed parameters from said memory to produce an audible ring pattern and ring tone.

2. A telephone set, according to claim 1, wherein the said plurality of ring parameters includes parameters representative of an intergroup delay and pulse group duration.

* * * * *